Sept. 2, 1969  J. D. HERRIMAN ET AL  3,464,792
METHOD FOR THE PRODUCTION OF METAL OXIDE
PARTICLES BY VAPOR PHASE OXIDATION
Filed March 11, 1966  3 Sheets-Sheet 1
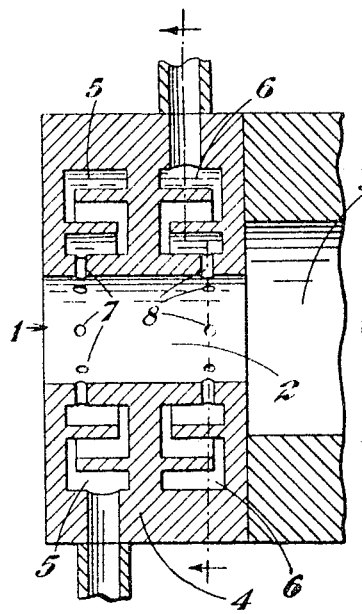
Fig.1.
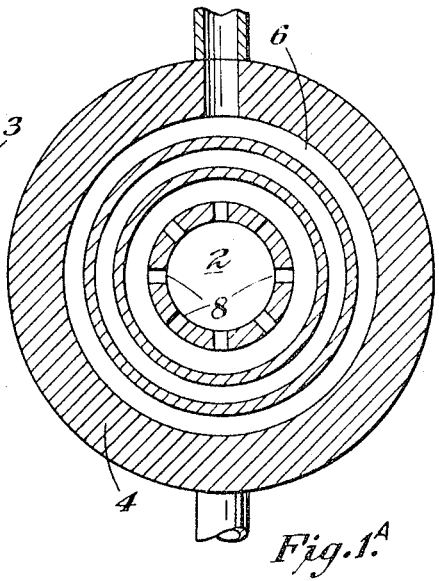
Fig.1.A
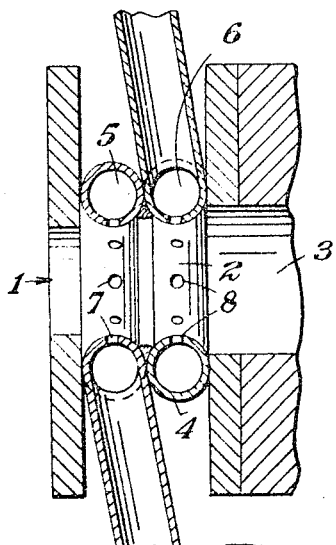
Fig.2.
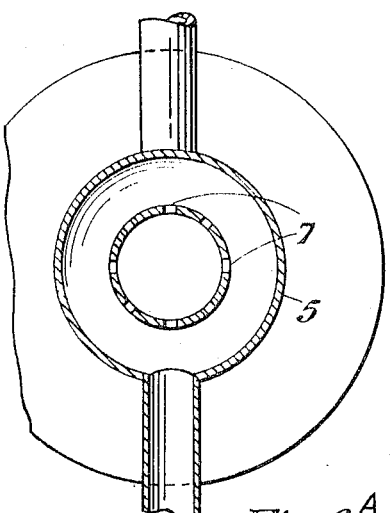
Fig.2.A

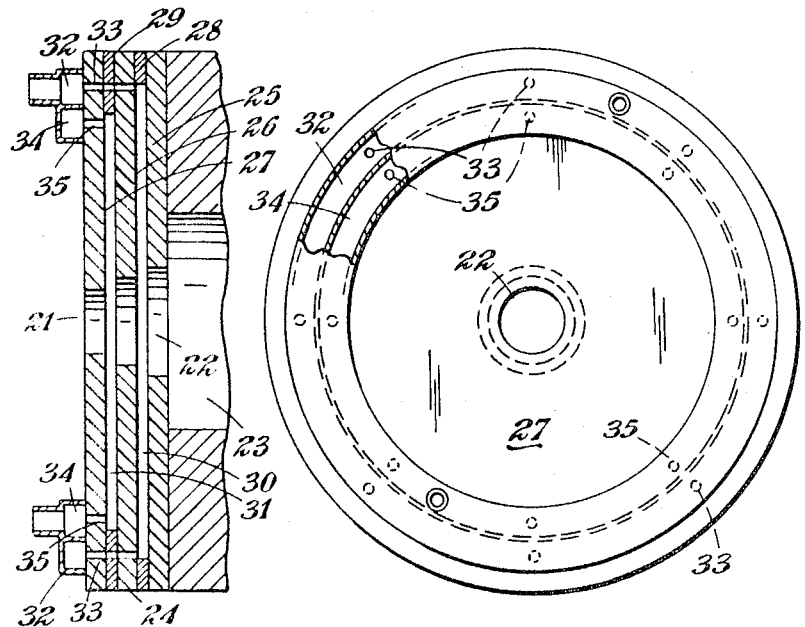
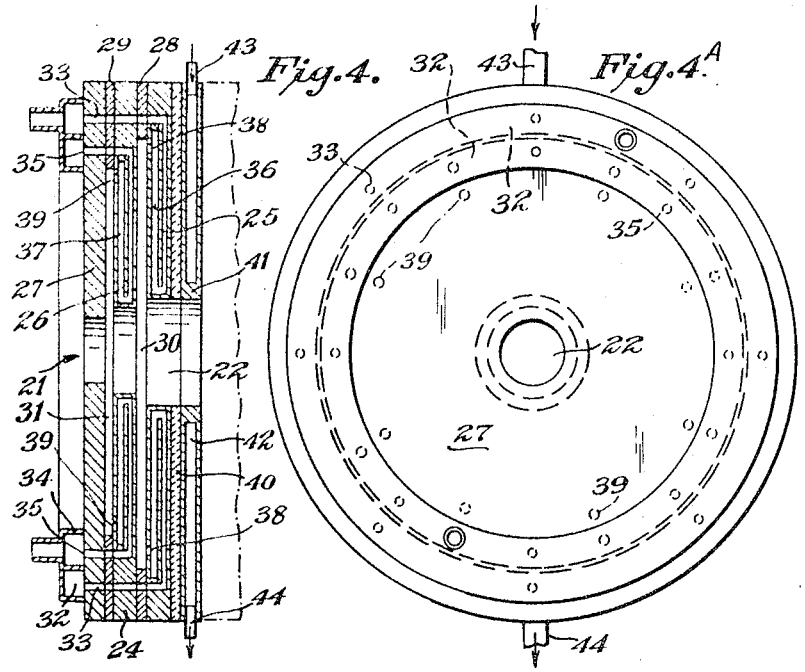

3,464,792
METHOD FOR THE PRODUCTION OF METAL
OXIDE PARTICLES BY VAPOR PHASE
OXIDATION
John Dennis Herriman, Great Ayton, and Alan Lawrence
Hare, Norton, Stockton-on-Tees, England, assignors to
British Titan Products Company Limited, Billingham,
England, a corporation of Great Britain
Filed Mar. 11, 1966, Ser. No. 533,527
Claims priority, application Great Britain, Mar. 18, 1965,
11,356/65
Int. Cl. C01b *13/14;* C01g *23/04;* B01j *1/14*
U.S. Cl. 23—202                                          10 Claims

ABSTRACT OF THE DISCLOSURE

By special design of an injection device and by a particular method of employing such injection device, it is possible to utilize metal injection devices under extremely high temperature conditions to produce metal oxide particles. It had previously been necessary to use refractory ceramic materials for injection devices in this oxidation process.

---

Figure 4B:
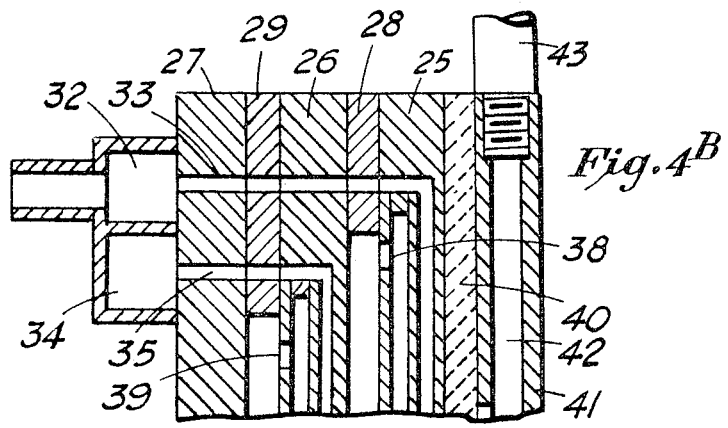

The present invention relates to a process for the production of finely-divided metal oxides.

In U.S. application Ser. No. 629,820, which is a continuation of U.S. application Ser. No. 256,386, there is described and claimed a process for the production of finely-divided metal oxides by the oxidation of a metal halide with an oxidising gas wherein there is introduced into the reaction zone in which the oxide is formed a gas which has been heated to a high temperature, for example to a temperature in excess of about 2,000° C., by passage through an electric arc such as an arc between electrodes or a radio-frequency induced gas plasma.

The gas which is thus heated may be an inert heat-carrying gas, for example argon or nitrogen, or it may be some or all of one of the reactants, i.e., an oxidising gas such as oxygen or air, or the metal halide which is to be oxidised.

Whichever gas is heated to a high temperature, there is introduced into the stream of gas so heated, while still at high temperature, one or more of the reactants (normally as a gas or vapour) in order that they may be rapidly heated to reaction temperature in the gas stream and therein react to form the desired finely-divided metal oxide.

Difficulty has been found in providing suitable means for the introduction of the reactant or reactants into the gas stream when the latter is at such high temperatures without overheating of the means of introduction and/or causing excessive corrosion thereof at such high temperatures. The use of burners cooled by the circulation and withdrawal of a separate heat exchange medium is difficult, and moreover may result in considerable heat loss from the apparatus, which is undesirable.

It has also been found difficult to prevent excessive accretion of metal oxide on the surfaces of the device through which the reactant or reactants are introduced into the hot stream of gas. It has also been found difficult to ensure that the reactant or reactants are introduced into the hot gas stream around its periphery in a uniform manner which is desirable if the reaction is to take place in a uniform and controlled manner.

It is also desirable to obtain the highest utilisation of heat input in the process by recovering the heat lost by radiation to adjacent solid surfaces in the form of preheat in the secondary reactants before introduction into the hot gas stream, the solid surfaces being maintained below the temperature at which excessive corrosion occurs (providing that where the reactants are premixed they are not heated to reaction temperature before introduction into the hot gas stream).

It is an object of the present invention to provide a process and apparatus to enable some or all of the above-mentioned disadvantages to be reduced or eliminated and increased heat utilisation and/or preheating of the reactants to be obtained.

Accordingly the present invention provides a process for the production of a finely-divided metal oxide by the oxidation in the vapour phase of the corresponding metal halide with oxidising gas, comprising introducing into a reaction zone a confined high temperature stream of a primary arc-heated gas comprising the oxidising gas or the metal halide or an inert gas, introducing into this primary gas stream at least one secondary gas comprising oxidising gas and/or metal halide, the secondary gas being supplied through an injection device comprising a plurality of inlets from a common supply manifold and being supplied in such a manner that the secondary gas cools the material forming the wall of the injection device and is thereby heated before passing into the primary gas stream.

The wall of the injection device cooled by the secondary gas is normally also a wall of the reaction zone. By this means the wall of the reaction zone which might otherwise have been raised to a dangerously high temperature may be very considerably cooled and its temperature may be substantailly controlled if desired.

The arc-heated primary gas stream is preferably at an average temperature of at least 2,000° C. It preferably has a minimum energy level equivalent to 10 kilocalories per gramme mole in excess of that required to raise the temperature of the gas to 1,000° C.

The arc-heated primary gas stream will normally be produced by passing the gas through a device (hereinafter called an electric arc device in which electrical energy is converted to heat energy in the gas, for example an alternating current or direct current arc between electrodes or an arc without electrodes, e.g., a gas plasma formed by inductively coupling the gas to an oscillatory current of suitable frequency (e.g., at a frequency in the range 10 kilocycles to 25 megacycles per second, particularly 1 to 10 megacycles per second) or other suitable form of electric discharge. Where an arc is formed between electrodes it may be advisable to make these of materials which do not discolour or which minimise contamination of the product. The aforementioned U.S. application and U.S. application Ser. No. 419,597 describe and claim processes which have features analogous to particular features mentioned in this paragraph.

The secondary gas may be fed into the primary gas stream either directly through a plurality of inlets spaced around the periphery or through a substantially continuous slot which is fed from a plurality of inlets. In both cases these inlets are preferably evenly spaced apart and are preferably at a frequency of at least one inlet per inch of periphery of the injection device surrounding the primary gas stream, most preferably at a greater frequency than this.

The invention also provides an apparatus for the oxidation of a metal halide comprising an electric arc device adapted to heat a gas on passage of the gas therethrough, the electric arc device having an exit orifice for the arc-heated gas, thus being an injection device adjacent the exit orifice to confine the arc-heated gas in a reaction zone, the injection device having a plurality of inlets spaced around its periphery surrounding the reaction zone which are connected to a common supply manifold in such a manner that a gas introduced into the common supply manifold and inlets will pass in heat exchange relationship with a wall of the injection device adjacent the reaction zone before issuing into the reaction zone.

The primary gas stream, preferably at an average temperature of at least 2,000° C., may conveniently enter the reaction zone directly through the exit orifice from the electric arc device. In such cases the injection device is desirably adjacent the exit orifice and it may be fixed to, or in contact with, the face of the electric arc device in such a manner as to surround the exit orifice from this device. This helps to ensure that the temperature of the primary gas stream is not allowed to fall substantially before it enters the reaction zone. However, a gas which is unreactive with the primary gas may be introduced across the face of the electric arc device surrounding the exit orifice and between the electric arc device and the injection device to prevent the accretion of metal oxide on the face of the electric arc device; the apparatus may comprise means for this purpose.

The reaction zone comprises the space into which the secondary gas is introduced, together with the space which follows (in the direction of flow of the primary gas stream) wherein the temperature remains high enough for oxidation of the metal halide to take place, e.g. a temperature above about 600° C. and preferably above 800° C. The first of these spaces is hereinafter called the primary reaction zone and the second is called the secondary reaction zone. The reaction zone will of course generally be at a considerably higher temperature than the wall of the injection device adjacent the reaction zone, which is normally maintained below 500° C. (preferably below about 250° C.), because of the relatively low temperature of the secondary gas stream when it is introduced into the injection device. The secondary reaction zone may be of different cross sectional area with respect to the first reaction zone, if desired, and may conveniently be lined with, or made from, a refractory material to withstand high temperature and/or attack by unreacted reactants or reaction products.

The finely-divided metal oxide produced in the reaction zone may be withdrawn therefrom and recovered by any convenient method. For example, the gas stream carrying the oxide may be passed, after cooling if desired, through filters or precipitators to recover the solids and the gases may pass to further treatment, for example to recovery of the halogen formed during the oxidation.

The recovered finely-divided oxide may be treated in any suitable manner. For example, if it is to be used as a pigment, particularly in the case of titanium dioxide, the material may be wet or dry milled, hydroclassified, dry or wet coated (for example with other metal or metalloid oxides or phosphate) dried and/or remilled, preferably in a fluid energy mill.

The metal halide used in the present invention is preferably a titanium tetrahalide, particularly titanium tetrachloride (although other halides such as zirconium tetrachloride or silicon tetrachloride or aluminium trichloride or ferric trichloride may alternatively be oxidised, if desired).

The oxidising gas may be any gas which will oxidise the metal halide to the corresponding oxide without detrimental effect upon the product. It is preferred that the oxidising gas is oxygen or air or oxygen-enriched air or steam, or a combination thereof.

The primary gas may comprise all, or part, of one of the reactants, i.e., the oxidising gas or metal halide. Where it comprises only part of one of the reactants the remaining part of the reactant will generally be introduced as part of the secondary gas.

Where the primary gas consists of an inert gas (which is normally only a heat-carrying medium although it may serve to nucleate the reaction between the metal halide and oxidising gas), all of this inert gas is generally heated to an average temperature of at least 2,000° C. before introduction into the reaction zone to form the confined primary gas stream into which the secondary gas is fed. Gases which are particularly suitable for this purpose are argon or nitrogen.

It is preferred to introduce into the reaction zone only a small excess, at most, of the inert heat-carrying gas over that necessary to sustain satisfactorily the oxidation of the metal halide since excessive quantities of such a gas dilute the reaction products and may complicate recovery of the reaction products, i.e., the metal oxide and the halogen released during the oxidation.

In some cases, particularly where pigmentary titanium dioxide is the product, it may be desirable to introduce small quantities of other materials in addition to the metal halide which is oxidised to form the main product. Examples of such other materials are an aluminium halide, a zirconium tetrahalide, a lower halide of titanium or water; a silicon tetrahalide, and a source of an alkali metal ion, for example a potassium halide. If such other material is a halide, which forms free halogen, it is convenient to use one which contains the same halogen as that formed during the main oxidation, since this facilitates recovery of the halogen. For example, aluminium trichloride, zirconium tetrachloride and/or silicon tetrachloride are preferred in the production of pigmentary titanium dioxide by the oxidation of titanium tetrachloride. Where such other materials are used in the production of titanium dioxide, suitable quantities include from 0.01% to 10%, particlarly 0.05% to 5% (as oxide by weight on $TiO_2$) in the case of the metal halides and 0.1% to 10%, particularly 0.5% to 5% (by weight on $TiO_2$) in the case of water. Sufficient of a source of an alkali metal ion may be added to give an amount of the ion (by weight on $TiO_2$) in the range 0.0001 to 5%, particularly 0.001 to 1%.

The additions of the other materials mentioned in the last paragraph are usually made to the secondary gas, but where compatible they may be introduced into the primary gas stream.

The primary gas may, if desired, contain particles which assist the nucleation of metal oxide particles. These may be provided by any suitable means, for example they may consist of ions or activated particles such as those which may occur naturally in a gas at very high temperatures, or they may be formed by the vaporisation of a suitable compound, e.g., a metal oxide such as titanium dioxide, into the primary gas stream. In the latter case it is believed that the vaporised material re-condenses to form the nuclei.

In an example of apparatus suitable for use in the process of the invention, the injection device may comprise a pipe or pipes surrounding the orifice through which the primary gas is introduced; the inner wall of the pipe(s) being pierced by the desired number of inlets and the pipe(s) having provision for the supply of a reactant or reactants. If desired, a number of such pipes may be provided spaced apart along the primary gas stream. They may be separated by distance pieces, if desired. Through the inlets in these pipes separate or premixed reactants may be introduced, as required.

Alternatively, the injection device may comprise a number of annular discs separated by similarly shaped distance pieces, wherein the inner edge of the central orifices of the distance pieces may be set back from the inner edge of the central orifice of the discs, thereby forming a radial slot or slots around the periphery of the gas stream. Where a radial slot or slots are present, a pluality of reactant inlets may be formed in the lower or upper surface of the disc or discs or in the distance piece(s) forming the rear wall of the slot(s) and a common supply manifold(s) provided either within the disc(s) or distances piece(s) or on the surface of the disc(s) (wherein the inlets pass through the disc(s)).

Where no radial slot(s) are formed, inlets may be formed in the inner edge of the discs and supplied by a common supply manifold formed with the disc.

It may be advisable, particularly where the ducting is formed in a disc, to ensure that the reactant(s) passing therethrough follow an involved path to ensure greater opportunity for heat exchange contact. For example, metal finning can be provided in the ducting.

Alternatively, the injection device may comprise concentric tubes between which the secondary gas may be introduced, there being inlets in the wall of the inner tube for passage of the secondary gas into the reaction zone around which (or around the primary portion of which) the inner tube may be located.

In order to provide a uniform flow of reactant(s) from each inlet it is desirable to ensure by experiment that each inlet allows a substantially equal amount of gas to pass through it. It is generally desirable to ensure that the inlet orifices are accurately formed to achieve the above result. Adequate uniform flow through each inlet may generally be obtained if the pressure at which reactants are introduced into the injection device is a pound or two per square inch greater than that existing in the reaction zone.

After the introduction of the secondary gas into the primary gas the reaction may proceed to completion in the reaction zone and the finely-divided metal oxide (and liberated halogen, if desired) may be recovered.

Alternatively, there may be introduced into the reaction zone, for example through the walls of the zone or through an inlet pipe or pipes within the zone, more metal halide and/or oxidising gas, so as to operate a process such as described and claimed in our British patent specification No. 991,318 wherein two or more further introductions of metal halide and/or oxidising gas are made in the reaction zone. It is believed that in such a process the particles initially produced by the process of the present invention act as nuceli upon which more metal oxide is deposited by the later additions of metal halide and/or oxidising gas, thus giving rise to a product of particularly well controlled and uniform particle size. One method which can be used for introducing a metal halide and/or oxidising gas into the reaction zone in order to form more metal oxide upon the particles produced by the process of the present invention is that described and claimed in U.S. application Ser. No. 417,130, wherein the injector through which the metal halide and/or oxidising gas are introduced into the reaction zone also forms a scraper for the removal of metal oxide deposits from the reactor walls.

In order that the secondary gas can provide adequate cooling of the wall of the injection device adjacent the reaction zone, the material of which such wall of the injection device is formed should have adequate heat conducting properties and is preferably a metal, for example stainless steel, nickel or aluminium.

An advantage of the use of metal is that it permits a very accurate construction of the inlets in an easily reproducible manner and facilitates assembly of the apparatus, as compared with the use of ceramic materials which would be required in the absence of cooling by the secondary gas.

Because of the cooling provided by the present process it is possible to use materials for the inlets and/or ducting (for example aluminium and nickel) which could not otherwise be used because of excessively high temperatures and of attack by the reactant(s) and reaction products. Such cooling is, of course, obtained without the necessity of providing separate coolant ducts and the introduction and withdrawal of a separate coolant. Furthermore, the reactant(s) are given a desirable pre-heating which may reduce the amount of heat which must be supplied to the reaction zone in order to maintain the reaction.

In the case where the ducting or other assembly confining the primary gas stream would be exposed to great heat from the secondary reaction zone (e.g., where the secondary reaction zine is of increased diameter relative to the primary reaction zone), it may also be of considerable advantage to make use of a preferred feature of the invention, which provides a shield (such as a cooled annular plate of heat-conducting material) located at the end of the injection device away from the electric arc device, i.e., between the injection device and the secondary reaction zone, so as to reduce heat transfer from the latter to the former. Such a plate may be introduced between ducting or other assembly of the injection device and the secondary reaction zone and may be provided with a passage or passages within through which a gaseous or liquid coolant may be passed.

The coolant supply of the shield may be separate from the reactants or, if desired, a reactant or reactants may be passed through the interior of the shield before being passed to the injection device or directly to the reaction zone. In an example of the latter case, the plate may be provided with means to introduce a cooling gas into the passage or passages through the outer periphery of the plate and a plurality of spaced orifices in the face of the plate away from the injection device for the withdrawal of the cooling gas; for example, a reactant may be passed through the interior of the plate and then introduced directly into the secondary reaction zone through the orifices in the face of the plate away from the injection device, so that the reactant thus introduced flows initially more or less parallel to the stream of mixed primary and secondary gas in the secondary reaction zone. In an example of a separate coolant supply, the plate may be provided with means to introduce a cooling gas into the passage or passages and means to withdraw the cooling gas from the passage or passages, through the outer periphery of the plate; for example air may be passed through the interior of the plate and exhausted to atmosphere.

The plate may conveniently be separated from the injection device by means of an insertion of insulating material or by the provision of a space, if desired.

The direction of introduction of the secondary gas may preferably be at right angles to the direction of the primary gas stream. It may however be at other angles; in the latter case, it may be preferable for it to have a component of motion opposed to the direction of the primary gas stream. As another alternative it is even possible to introduce the secondary gas tangentially to the face of the injection device if desired.

The accompanying drawings show various embodiments of apparatus suitable for use according to the present invention.

FIGURES 1, 2, 3, 4, 5 and 6 are vertical sections of six different embodiments; FIGURES 1A, 2A, 3A and 4A are plan sections of the embodiments of FIGURES 1, 2, 3 and 4, respectively. FIGURE 4B is an enlarged portion of FIGURE 4A.

In FIGURES 1 and 1A an entrance for a confined primary gas stream is shown at 1, a primary reaction zone at 2 and a secondary reaction zone at 3. The primary reaction zone 2 is surrounded by an injection device 4 in which are formed ductings 5 and 6, these ductings consisting of a series of annular passages concentric with the primary reaction zone 2. Inlets 7 and 8 lead from the ductings 5 and 6, respectively, into the primary reaction zone 2. Each set of inlets 7 and 8 forms a series of inlets disposed around the periphery of the primary reaction zone 2.

In operation, the primary gas stream is introduced at 1 and while it flows through the primary reaction zone 2 one reactant is fed into it through ducting 5 and inlets 7 while the other reactant is fed into it through ducting 6 and inlets 8. Alternatively, it is possible to introduce a mixture of the two reactants into both ductings and through both sets of inlets.

In FIGURES 2 and 2A, the reference numerals have the same significance as in FIGURES 1 and 1A and the operation may be similar.

The constructions shown in FIGURES 3 and 4 are somewhat different from those shown in FIGURES 1 and 2.

In FIGURES 3 and 3A, the entrance for the primary gas stream is at 21, primary reaction zone is at 22 and the secondary reaction zone is at 23. An injection device 24 is formed by three annular discs 25, 26 and 27 separated by annular distance pieces 28 and 29. Annular slots 30 and 31 are thereby formed for the introduction of the secondary gas into the primary reaction zone 22. The annular slot 30 is fed from a common manifold 32 through inlets 33 while the annular slot 31 is fed from a common manifold 34 through inlets 35.

In operation, the primary gas is introduced at 21 and while it flows through the primary reaction zone 22 one reactant is introduced through the common manifold 32, inlets 33 and annular slots 30 while the other reactant is introduced through the common manifold 34, inlets 35 and annular slot 31. Alternatively, a mixture of both reactants can be fed through one or both sets of manifolds, inlets and slots.

In FIGURES 4, 4A and 4B the reference numerals which are similar to those of FIGURE 3 represent corresponding components, and the operation is similar. However, each inlet 33 and 35 leads into ducting 36 and 37 formed within the annular discs 25 and 26 from which passages 38 and 39 lead into annular slots 30 and 31 whereby greatly enhanced heat exchange between the material of the annular discs and the secondary gas is obtained.

The shield which is a preferred feature of the invention is shown by way of example in FIGURE 4. It is located so as to protect exposed parts of the injection device 24 from heat within the secondary reaction zone 23. The shield comprises a spacing ring 40 of insulating material and a metal annular plate 41 provided with an annular passage 42. The coolant, for example air, may be introduced into the passage 42 through an inlet port 43 and may be withdrawn through an outlet port 44.

Figure 5:
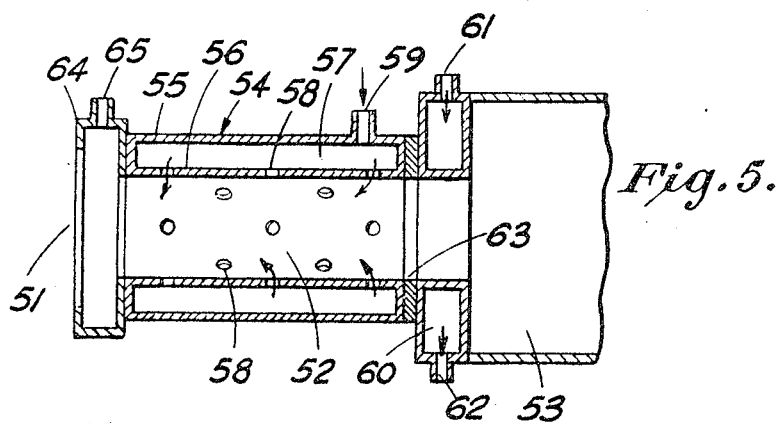

In FIGURE 5, the entrance for the primary gas stream is shown at 51, a primary reaction zone at 52, and a seconday reaction zone at 53. The primary reaction zone 52 is surrounded by an injection device 54 comprising two concentric tubes 55 and 56, enclosing a space 57 between them so as to form a manifold. Orifices 58 in the inner tube 56 form inlets from the manifold into the primary reaction zone 52. A passage 59 allows a gas to be introduced into the manifold.

A shield between the injection device 54 and the secondary reaction zone 53 is formed by a hollow annular plate 60 having inlet port 61 and outlet port 62 for the passage of a cooling fluid through the plate. The plate 60 is separated from the injection device 54 by an insulating ring 63.

A circular member 64 having an inlet port 65 provides a circumferential slit around the entrance of the primary gas 51 and allows a gas (e.g., a reactant) to be passed into the primary gas stream at this place.

Figure 6:
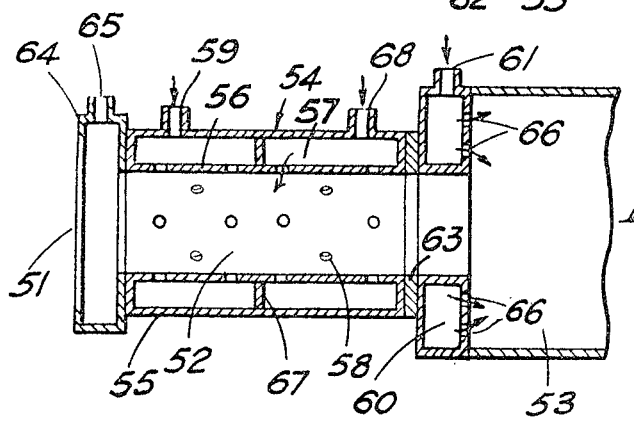

In FIGURE 6, the reference numerals which are similar to those of FIGURE 5 represent corresponding components. The annular plate 60 has outlet ports 66 so that the fluid introduced into the plate 60 through the inlet port 61 can flow through these outlet ports 66 into the secondary reaction zone 53 in a direction generally parallel to and concentric with the primary gas stream. The space 57 is divided into two portions by a flange 67, there being a passage 59 for one portion and a passage 68 for the other portion.

It may sometimes be of advantage to introduce the secondary gas in such a way that it tends, as it enters the reaction zone, to flow in the direction of the primary gas stream. By this means, the edges of the inlets or slots may be more efficiently cooled and/or the production of metal oxide deposits on such edges may be prevented or reduced, while at the same time the secondary gas becomes sufficiently mixed with the primary gas stream for them to react to form nuclei of metal oxide which may be built up into larger particles in the course of further reaction. In order to assist the tendency of the secondary gas to flow in the direction of the primary gas stream as it enters the reaction zone, its velocity of introduction may be kept low.

An alternative or additional way of assisting the cooling of the edges and/or the prevention or reduction of metal oxide deposit thereon is to flow a "purge" gas along the wall of the reaction zone over the inlets or slots; such a gas would tend to sheath the primary gas stream from too great contact with the edges and consequent overheating thereof and/or deposit thereon. The "purge" gas may be one of the reactants, such as oxygen, or it may be an inert gas, such as argon or nitrogen; most preferably, it is a halogen gas (chlorine if the metal halide is a chloride).

As an example of a method of introducing the "purge" gas, it may be mentioned that in the case of the construction shown in FIGURE 1 a circular conduit for the "purge" gas, with a diameter substantially that of the reaction zone 2, could be disposed immediately to the left (as seen in the drawing) of the assembly 4 so as to be concentric with the reaction zone 2. A circular slot in such conduit could allow the "purge" gas to flow as a cylindrical sheath through the reaction zone 2 over the inlets 7 and 8.

An analogous method of introducing such a "purge" gas is to employ apparatus such as is shown in FIGURES 5 and 6, where the "purge" gas may be introduced into the inlet port 65 and enter the primary reaction zone 52 through the slit formed by the circular member 64.

The invention is illustrated by the following examples.

Example I

The apparatus comprised the components shown in FIGURE 5, the axis of the apparatus being disposed vertically so that the secondary reaction zone 53 was below the primary reaction zone 52.

The inner tube 56 was formed from an aluminium tube 2 in. in internal diameter and 0.56 in. long. This was placed in a surrounding mild steel tube 55 in such a manner that a space 57 was provided between the exterior of the aluminium tube and the steel tube.

The aluminium tube 56 had four rows of holes 58 each row consisting of 32 holes 0.063 in. in diameter separated from each other by a distance of 0.17 in. The holes in alternate rows were vertically in line.

The end of the device rested on (but was insulated from) a hollow plate 60 which formed the top of a 6 in. diameter reactor enclosing the secondary reaction zone 53.

A plasma gun was placed upon the top of the device but was separated therefrom by the circumferential slot 64 which was 0.62 in. wide. The outlet from the plasma gun was an orifice in the anode 0.38 in. in diameter, This was directed centrally through the entrance 51.

In operation, argon was supplied to the plasma gun at a rate of 1.1 g. moles per minute and sufficient electrical energy was supplied to the gun to give a power input of 173 kilocalories per minute. The estimated average temperature of the gas issuing from the orifice of the plasma gun into the injection device was about 11,000° K.

Oxygen was introduced through the slot 64 at a rate of 0.8 g. mole per minute.

Premixed oxygen and titanium tetrachloride (preheated to 150° C.) was introduced through the passage 59 into the space 57 and the gases passed from this space through the holes 58 into the primary reaction zone 52.

The oxygen/titanium tetrachloride mixture contained 2 g. moles per minute of $TiCl_4$, 5.2 g. moles per minute of oxygen and sufficient aluminium trichloride and silicon tetrachloride to give 2% alumina and 0.5% silica.

The incoming gaseous reactants were found to maintain the aluminium wall 56 of the device at a temperature of about 220° C. thereby preventing any attack by the reactants and/or reaction products upon the aluminium. Any reaction between the oxygen and the halides before passing through the holes 58 in the device was also avoided at this temperature.

During operation, air was circulated within the hollow plate 60 thereby cooling this plate.

During operation the temperature in the secondary reaction zone was about 1,050° C.

The face of the plasma gun and the device remained substantially free from titanium dioxide accretions and there was no sign of attack upon these surfaces by the reactants or reaction products.

The titanium dioxide produced contained 97% rutile and had a tinting strength (on the Reynolds scale) or more than 1,600. It was also of excellent colour.

Example 2

The apartus comprised the components shown in FIGURE 6, its axis being disposed vertically so that the secondary reaction zone 53 was below the primary reaction zone 52.

The inner tube 56 was formed from an aluminium tube similar to that of Example I except in that it was 1.36 in. long and carried six circumferential rows of holes, each row containing 22 holes 0.88 in. in diameter and the holes in alternate rows being vertically in line. The six rows of holes were divided into two banks of three rows each by the flange 67.

During operation, argon was supplied to the gun at a similar flow rate to that in Example I and the power input to the plasma gun was also as described in that example. The temperature of the gas leaving the plasma gun was about 11,000° K.

Oxygen was introduced through the circumferential slot 64 between the plasma gun and the top of the device as described in Example I.

Oxygen preheated to 170° C. and at a flow rate of 5.2 g. moles per minute was also supplied through a single passage 59 to the upper portion of the space 57 and it then passed through the top three rows of holes 58 into the primary gas stream in the primary reaction zone 52.

Titanium tetrachloride preheated to 150° C. and at a flow rate of 2 g. moles per minute was supplied through the inlet passage 68.

The oxygen contained sufficient aluminium trichloride to give 2% alumina and the titanium tetrachloride sufficient silicon tetrachloride to give 0.25% silica.

Titanium tetrachloride vapour was introduced into the hollow plate 60 at a rate of 3 g. moles per minute and at a temperature of 150° C. to cool this plate. After passing through the interior of the plate, the titanium tetrachloride entered the reactor through the outlet ports 66 drilled vertically in the lower face of the plate and flowed parallel with the reactants and reaction products issuing from the primary reaction zone, mixing and reacting progressively with these to form $TiO_2$ on the titanium dioxide particles produced by the reactants introduced through the holes in the injection device.

During operation, the face of the plasma gun, the interior of the injection device, and the cooled plate remained substantially free from $TiO_2$ accretion and the temperature of the aluminium wall of the device was maintained at about 230° C.

The pigmentary titanium dioxide produced was of excellent colour, had a rutile content of 99% and a tinting strength (on the Reynolds scale) of about 1,780.

What is claimed is:

1. In the process for the production of a finely-divided metal oxide by the vapor phase oxidation of a metal halide with an oxidizing gas wherein a primary gas selected from the group consisting of metal halide, oxidizing gas, inert gas and mixtures thereof is heated by electric discharge means to a temperature of at least 2,000° C. and introduced as a confined, high-temperature stream into a reaction zone, and a secondary gas selected from the group consisting of metal halide, oxidizing gas and mixtures thereof is introduced into said primary gas stream in said reaction zone for reaction to form said metal oxide, the improvement which comprises providing an injection device for said secondary gas which comprises a metal wall having a plurality of orifices communicating with a common secondary gas supply manifold;

positioning said injection device adjacent the inlet of said primary gas to said reaction zone with said metal wall disposed adjacent said reaction to provide communication between said supply manifold and said reaction zone through said orifice in said metal wall; and injecting said secondary gas into said reaction zone through said injection device at a rate and temperature to maintain said metal wall at a temperature below 500° C.

2. A process according to claim 1 in which the secondary gas is fed into the primary gas stream through a plurality of inlets spaced around the periphery of the injection device surrounding the primary gas stream.

3. A process according to claim 1 in which the secondary gas is fed into the primary gas stream through a substantially continuous slot disposed around the periphery of the injection device surrounding the primary gas stream, the secondary gas being fed into the slot from a plurality of inlets spaced along the slot.

4. A process according to claim 1 comprising the prior step of heating the primary gas in an electric arc device from which the heated primary gas is passed directly into the reaction zone.

5. A process according to claim 4 in which a cold gas unreactive with the primary gas is interposed between the electric arc device and the injection device.

6. A process according to claim 1 in which the temperature of the reaction zone is above 800° C. and the temperature of the wall of the injection device is below 250° C.

7. A process for the production of a finely-divided metal oxide comprising heating in a gas plasma a stream of a primary gas selected from the group consisting of a metal halide, an oxidising gas, an inert gas and mixtures thereof, whereby the temperature of the primary gas is raised to at least 2,000° C.; introducing the primary gas stream at substantially such temperature into the reaction zone; passing a secondary gas selected from a metal halide, an oxidising gas and mixtures thereof through a common supply manifold and a plurality of inlets in an injection device into the heated primary gas stream in the reaction zone, the secondary gas being supplied to the injection device at a temperature below 250° C. so as to cool the wall of the injection device adjacent the reaction zone, and reacting the metal halide and the oxidising gas in the reaction zone to produce finely-divided metal oxide.

8. A process according to claim 7 in which the gas plasma is formed by an oscillatory current having a frequency from 10 kilocycles to 25 megacycles per second.

9. A process according to claim 7 in which the metal halide is titanium tetrachloride.

10. A process according to claim 7 in which the metal halide is selected from the group consisting of zirconium tetrachloride, silicon tetrachloride, aluminium trichloride and ferric trichloride.

References Cited

UNITED STATES PATENTS

| | | | |
|---|---|---|---|
| 2,957,753 | 10/1960 | Nelson | 23—202 |
| 2,978,316 | 4/1961 | Weir | 75—10 |
| 3,203,763 | 8/1965 | Kruse | 23—142 XR |
| 3,208,866 | 9/1965 | Lewis | 106—300 |
| 3,275,411 | 9/1966 | Freeman et al. | 23—202 |
| 3,275,412 | 9/1966 | Skrivan | 23—202 |
| 3,361,525 | 1/1968 | De Rycke et al. | 23—142 XR |

EDWARD STERN, Primary Examiner

U.S. Cl. X.R.

23—139, 140, 142, 182, 200, 277; 106—300; 204—164